United States Patent [19]

Holliday, Jr.

[11] 4,346,675

[45] Aug. 31, 1982

[54] STEAM INJECTION SYSTEM FOR ENGINES

[76] Inventor: John T. Holliday, Jr., 308 Strawbridge Dr., Chesterfield, Mo. 63017

[21] Appl. No.: 164,134

[22] Filed: Aug. 30, 1980

[51] Int. Cl.³ .............................................. F02D 19/00
[52] U.S. Cl. ............................... 123/25 P; 123/25 B; 123/25 L
[58] Field of Search ................. 123/25 B, 25 E, 25 P, 123/25 D, 25 L

[56] References Cited

U.S. PATENT DOCUMENTS

| | | | |
|---|---|---|---|
| 2,444,628 | 7/1948 | Briggs et al. | 123/25 B |
| 3,665,897 | 5/1972 | Boyer | 123/25 B |
| 3,996,902 | 12/1976 | Ri et al. | 123/25 B |
| 4,030,456 | 6/1977 | Corpus | 123/25 B |
| 4,050,419 | 9/1977 | Harpman et al. | 123/25 B |
| 4,114,566 | 9/1978 | Harpman et al. | 123/25 B |
| 4,125,092 | 11/1978 | Inamura | 123/25 B |
| 4,141,323 | 2/1979 | Hart | 123/25 B |
| 4,145,998 | 3/1979 | Mahoney et al. | 123/25 B |
| 4,150,639 | 4/1979 | Buszek | 123/25 B |
| 4,166,435 | 9/1979 | Kiang | 123/25 B |

FOREIGN PATENT DOCUMENTS 2546059  4/1977  Fed. Rep. of Germany .... 123/25 P

Primary Examiner—Charles J. Myhre
Assistant Examiner—E. Rollins Cross
Attorney, Agent, or Firm—Rogers, Eilers & Howell

[57] ABSTRACT

A flow system for an internal combustion engine has a first conduit connected to a water reservoir and extending therefrom to pass adjacent a heating source such as the exhaust pipe of an automobile engine, and then passes to connection with the bore of an adapter plate beneath the throttle plate of a carburetor. A second conduit extends adjacent the exhaust pipe to be heated so that air from the atmosphere can pass through it to the carburetor and intake manifold. A third conduit connects the first and second conduit, and a fourth conduit connects the third and first conduit. The first, second and fourth conduits have flow control spiral orifice pieces which restrict the flow of fluid. In operation, pressure differentials existing within the carburetor and the carburetor adapter plate create water flow from the water reservoir through the first conduit with water and air flow being regulated by the spiral orifice pieces so that water flows through at a desired rate to be heated by the exhaust pipe and converted to steam to pass into the adapter plate bore, with air from the atmosphere flowing through the opening of the second conduit for mixture with water flowing from the first conduit, and with the third and fourth conduits providing a bypass arrangement for fluid flow.

27 Claims, 6 Drawing Figures

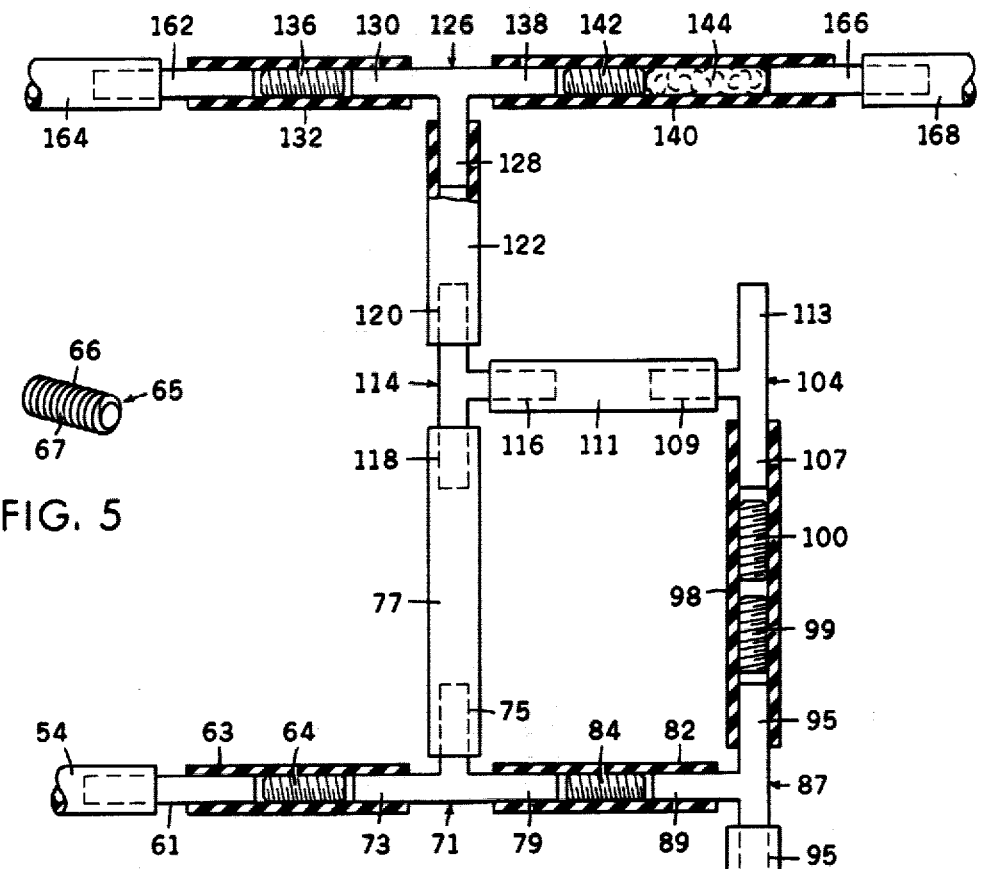
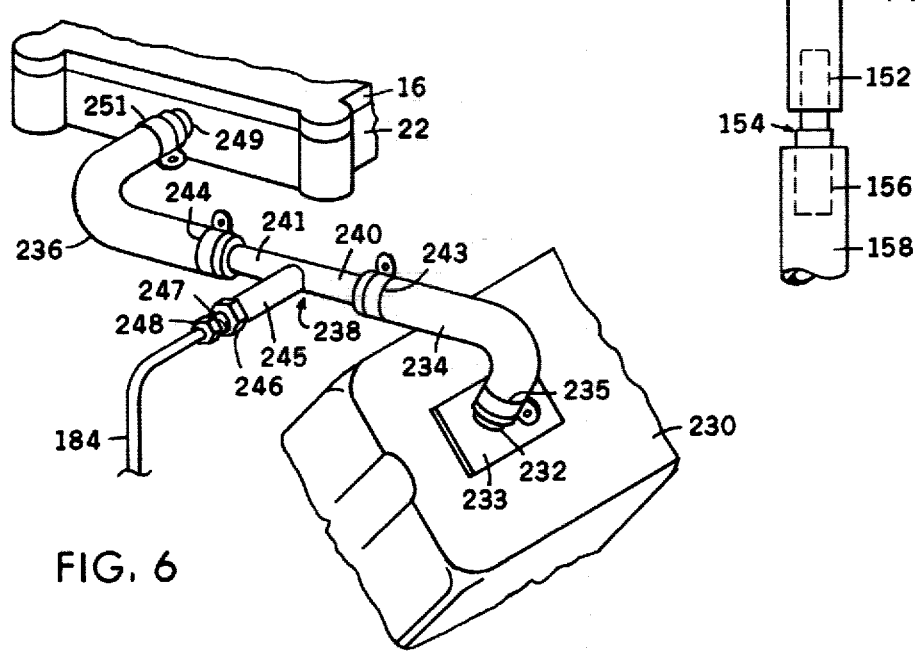

STEAM INJECTION SYSTEM FOR ENGINES

BACKGROUND AND SUMMARY OF THE INVENTION

The present invention pertains to means for using water and steam in internal combustion engines to provide better engine efficiency and a lower use of fuel. It has been known in the prior art that mixing steam or water vapor with fuel and air in a carburetor of an internal combustion engine, such as a gasoline engine, has certain advantageous effects. However, in the prior art there has not been an effective means of providing control of the flow of water or steam into the carburetor or into other points of an engine.

The present invention improves over the prior art. It provides first, second, third and fourth conduits which are interrelated to provide proper regulation of flow of water from a reservoir so that steam converted from the water can flow into the carburetor and adapter plate of an engine with an illustration being provided for a gasoline engine used for automobiles.

The invention has a first conduit extending from the water reservoir to be heated by heat from the exhaust pipe of an automobile, and thence extending into an opening in the adapter plate bore of an engine at a point beneath the throttle plate of the carburetor. The invention has a second conduit having one end open to the atmosphere and affixed to the exhaust pipe and extending therefrom to the bore forming the fuel flow path in the carburetor. A third conduit connects the first and second conduits, while a fourth conduit connects the third and first conduits for purposes of providing proper flow regulation. The interrelationships of the four conduits with flow regulating members forms a flow control system.

The flow control system has an arrangement of flow control members which are placed within the first, second and fourth conduits to regulate water flow. A flow control member is placed within the first, second and fourth conduits.

The flow control members in the preferred embodiment are spiral orifice pieces which can be of helical thread size. The orifice pieces can be the size of a 3/16 inch (0.48 cm) diameter screw having 24 threads per inch (per 2.54 cm) of length. The length of one of the spiral orifice pieces within the first conduit is a function of the engine cylinder displacement for the engine with which the system is used. Helical thread sizes are commercially available in the form of headless screws, and these can be used as the spiral orifices as they are customarily manufactured with close tolerances.

The spiral orifice pieces provide the advantage of having a long flow path over a short distance due to the flow path being wound helically about the cylindrical base of the orifice piece. The bends in the spiral orifice flow path create more friction than would be caused by a straight orifice path of the same length, which additional friction increases the pressure drop across the orifice. The orifice pieces thus act to control and regulate the flow of water and of water and air through the various conduits to provide the desired amount of water and water and air.

The spiral orifice pieces have no moving parts and thus offer many advantages over previous types of flow control valves that have been used in steam or water vapor injection systems, as there is no maintenance necessary for the orifice pieces, and without moving parts the probability of malfunction is much less than with a valve having moving parts. Yet without moving parts, the arrangement of the conduits with their orifice pieces allows regulation and adjustment of flow to provide the amount of flow desired.

The size of the cylinder in automobile engines and other engines is designed so that the engine can deliver the amount of power necessary for peak load conditions when great acceleration or delivery of power is needed. However, at operating conditions when the load is light, such as idle conditions, or at cruise conditions, i.e., when the automobile is not being accelerated and is riding on flat terrain, the demand upon the engine is not as great. Therefore, though the engine has the capacity to deliver power desired under peak load conditions, such as acceleration, it is not as efficient as possible under light load conditions such as at idle or at cruise. The present invention is thus designed so that the engine can operate at full capacity under peak load conditions without the injection of steam into the fuel-air mixture, but so that at light load conditions, steam can be injected into the fuel-air mixture so that less of the fuel-air mixture goes to the engine cylinder than would go were not the steam present, that is, that would go under normal conditions of the engine. Thus, the present invention is designed to accommodate and to adjust to those circumstances when an engine is oversized for the load conditions to which it is subjected. The present invention, by reducing the amount of air and fuel going through the intake manifold accomplishes this by providing a regulated flow of steam to be mixed with the fuel-air mixture to reduce the amount of fuel-air flowing to the engine cylinders.

The ratio of air to fuel is not changed by injection of the steam. The steam only takes up space that would normally be filled with a fuel-air mixture.

The flow control system operates as desired under other engine loads in addition to idle and cruise. When the throttle is in the wide open position, there is no water flow through the first conduit. Thus when the engine is in need of a fuel-air mixture without steam at wide open throttle, at peak load conditions, no steam is injected into the fuel-air mixture of the carburetor. In throttle positions between wide open throttle and cruise, the invention acts to inject an amount of steam less than the amount injected at cruise, but more than the amount injected at wide open throttle.

DESCRIPTION OF THE DRAWINGS

FIG. 2 is a front elevation of the flow control assembly, some parts being shown in section;

FIG. 5 is a perspective view of a spiral orifice flow control piece; and

FIG. 6 is an enlarged view of a portion of FIG. 1 showing connection of the flow assembly to the adapter plate bore and carburetor bore.

DESCRIPTION OF THE PREFERRED EMBODIMENT

Figure 1:
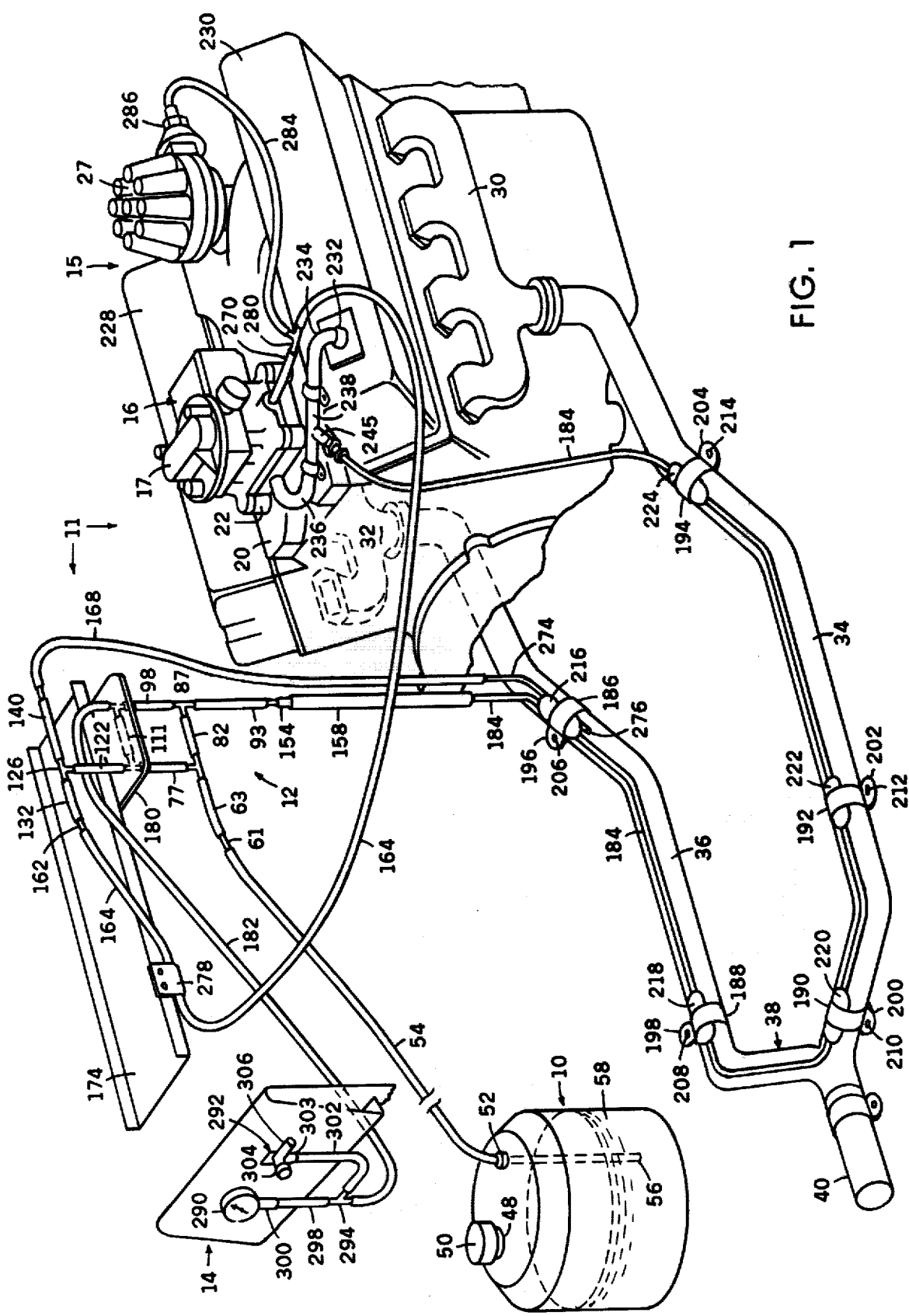
FIG. 1 shows a perspective view of the flow assembly in connection with parts of an automobile engine assembly.

FIG. 1 shows generally a water reservoir depicted as a water tank 10, and a water, air and steam flow assembly 11. The flow assembly 11 includes a flow control system 12 shown in detail in FIG. 2. FIG. 1 further shows a section 14 of an automobile dashboard, a typical V-8 automobile engine 15 having a typical carburetor 16 with a choke opening 17, an inlet manifold 20, and an adapter plate 22 positioned between the carburetor and the inlet manifold. FIG. 1 also shows a pair of exhaust manifolds 30 and 32 respectively connected to the arms 34 and 36 of a exhaust pipe 38 which leads into a middle body 40.

In more detail, the water tank 10 can be of plastic or metal, and has a projecting threaded inlet opening 48 through which the tank can be filled, the opening 48 being sealed by a removable screw cap 50. Tank 10 has an outlet opening 52 having a cylindrical plastic fitting, which telescopically receives a hose 54 so that the opening 56 at the lower end of hose 54 can be submerged in tank water 58. Tank 10 can be mounted on the floorboard of an automobile (not shown), or in some other part of an auto, and can hold 3½ gallons (13.25 liters) of water. The tank is open to the atmosphere.

Hose 54 extends upwardly, and can pass through openings in the barrier between the passenger compartment of an auto and the engine, to a copper connector tube 61 (FIG. 4) which has one end snugly received within the upper end of hose 54 and its other end snugly received within the lower end of a short hose 63 so that water can flow from hose 54 to hose 63.

Hose 63 forms a lower end of the flow control system 12.

Contained within the inner wall of hose 63 is a spiral orifice piece 64 which acts to control the flow of water through hose 63. The orifice piece 64 is made of metal such as stainless steel or brass, and is of cylindrical shape with a spiral helical groove widing about the exterior of the cylinder so that a spiral flow path is formed between the inner wall of hose 63 and the exterior edges of the groove. FIG. 5 shows a perspective view of an orifice piece 65 showing a spiral groove 66 and a recessed spiral flow path 67. Orifice piece 64 and other orifice pieces to be described have such helical flow structure as shown in FIG. 5. It has been found that the helical threads of common headless screws, such as Allen head screws, are suitable for use as a spiral orifice piece because such screws are customarily manufactured with close tolerances, which reduce inspection requirements.

The flow control system 12 further comprises a T-tube 71 having a lower leg 73 which is telescopically snugly received within the inner end of tube 63, an upper leg 75 telescopically snugly received within the lower end of a hose 77, and another lower leg 79 telescopically snugly received within an end of a hose 82.

Hose 82 has contained within its walls a spiral orifice piece 84 such as the spiral orifice 64 except of a different length as will be later explained, so that a spiral flow path is formed between the groove and the inner wall of hose 82 in the same manner previously explained for orifice piece 64. Hose 82 extends to a second T-tube 87 having a cross-leg 89 fitted within the wall of hose 82, a lower leg 91 which fits within the wall of a lower hose 93, and an upper leg 95 which fits within the wall of an upper hose 98. Hose 98 contains within its wall a pair of spiral orifice pieces 99 and 100 so that a spiral flow path is formed about each piece. The inner ends of orifice pieces 99 and 100 are separated by a short distance. The combined length of pieces 99 and 100 is twice the length of each of the pieces 84, 136 and 142.

At the upper end of hose 98, a third T-tube 104 has a lower leg 107 which fits within the upper end of hose 98, a cross-leg 109 which fits within an end of a hose 111, and an upper leg 113 which extends to a valve and/or pressure gauge as will be hereinafter explained.

Hose 111 extends to a fourth T-tube 114 having a cross-leg 116 that fits within the wall of hose 111, a lower leg 118 received within the walls of hose 77, and an upper leg 120 received within the wall of a hose 122.

Hose 122 extends upwardly to connection with a fifth T-tube 126 having a lower leg 128 received within the wall of hose 122 and a cross-leg 130 received within the wall of a hose 132. Hose 132 has a spiral orifice piece 136 contained within its wall to form a spiral flow path.

T-tube 126 has a third cross-leg 138 which fits within the wall of a hose 140. A spiral orifice piece 142 fits within the wall of hose 140 to form a spiral flow path. Also contained within hose 140 is a filter 144, which can be of cotton, and which acts to filter atmospheric air.

The aforementioned members 63 through 144 comprise the flow control system 12. As previously described, the water from the tank 10 is connected through hose 54 and tube 61 to control system 12 so that water can flow from the tank to the control system.

Control system 12 is further connected to other hoses for fluid flow connection to other points. Referring to FIG. 2, the lower end of hose 93 receives the smaller end 152 of a plastic connecting tube 154, while the larger end 156 of tube 154 fits within the upper end of a hose 158.

Leg 113 of T-tube 104 is connected to a hose leading to a valve and/or vacuum gauge as will be described for FIG. 1. At the upper end of FIG. 2, hose 132 receives an end of a copper connector tube 162 whose other end fits within the end of a hose 164. Also, at the upper end of FIG. 2, hose 140 receives an end of a copper connector tube 166 whose other end fits within the end of a hose 168.

Each of the hoses 54, 63, 77, 82, 93, 98, 111, 122, 132, 140, 158, 164 and 168 are of resilient material such as rubber or flexible plastic, and each are approximately 3/16 inch (0.48 cm) inside diameter (I.D.) except hose 158 which has an I.D. of approximately 0.25 inch (0.635 cm). The hoses 77, 98 and 140 are about 2¼ inch (5.715 cm) long, and hoses 82, 63, 93, 132, 111 and 122 are about 1½ inch (3.81 cm) long. Each of the T-tubes 71, 87, 104, 114 and 126 can be made of plastic, with each leg having an I.D. of about ⅛ inch (0.3175 cm), and an outside diameter (O.D.) of about 3/16 inch (0.48 cm) so that each leg of the T-tube fits snugly within walls of the respective hose to which it is connected with the inner wall of the resilient hoses gripping about the T-tube legs, to hold them from sliding away and to allow fluid to flow from the connecting hoses through the T-tube into the other connecting hoses without fluid or vacuum leakage. Each of the connector tubes 61, 162 and 166 can be of metal such as copper, with an I.D. of about ⅛ inch (0.3175 cm) and an O.D. of about 3/16 inch (0.48 cm). The spiral orifices as previously mentioned, can be of helical thread size. Orifice piece 64 is the size of a 3/16 inch (0.48 cm) diameter screw having 24 threads per inch (per 2.54 cm) of length, with the length being a function of the engine displacement for the V-8 engine 15 with which it is used. With an engine having 120 cubic inch (1966.44 cubic cm) displacement, a length of 11 threads has been found appropriate, such as illustrated for piece 65 in FIG. 5. For a 200 cubic inch (3277.4 cubic cm) engine, 8 threads of length has been found appropriate, and for a 300 cubic inch (4916.1 cubic cm) engine and up, a length of 5 threads has been found appropriate.

The other orifice pieces 84, 99, 100, 136 and 142 are also 3/16 inch (0.48 cm) diameter screws having 24 threads per inch (per 2.54 cm) of length, with 11 threads in length having been found to be a suitable length for said orifice piece, though other lengths have been successfully used, however, the said pieces should be of equal lengths. All the orifice pieces are preferably of stainless steel, or of brass or other non-corrosive metal. As the threads are 3/16 inch (0.48 cm) diameter, the inner wall of the 3/16 inch (0.48 cm) I.D. hoses fit snugly about them to form the spiral flow path about the orifice piece.

The control assembly 12 can be mounted to be supported free of the engine 15 under the hood of an automobile. FIG. 1 shows a portion of a cross brace 174 typically used underneath the hood of an automobile to provide structural support, the brace being shown in section with its ends extending to be firmly secured to the chassis structure about the hood of an auto as is known in the art. Extending outwardly from beneath brace 174 is a metal flange 180 secured to the under side of brace 174 as by screws and bolts (not shown) extending through holes in brace 174. Flange 180 has a pair of holes spaced so that the T-tube legs 113 and 120 shown in FIG. 2 fit snugly within them, the holes being of about 3/16 inch (0.48 cm). With the holes in flange 180 sized as such, the T-tube legs 113 and 120 can slide easily within and without the holes. The hose 122, being of a larger diameter than the holes in flange 180, rest above the flange and cannot pass through the holes. A hose 182 receives the leg 113 of T-tube 104 so that the lower end of hose 182 rests against the top of flange 180 above the hole through which T-tube leg 113 extends. The friction grip of the inner walls of hoses 122 and 182 about their respective T-tube legs 120 and 113 allows flange 180 to support the flow control assembly 12 so that the hose 111 extends horizontally slightly beneath flange 180, and hoses 77 and 98 depend downwardly from bracket 180 at about right angles to flange 180.

Continuing now with flow connections to the flow control system 12, the hose 158 which descends from the lower end of the flow control system extends downwardly towards the exhaust pipe 38 and at its lower end snugly receives the upper end of a tube 184 which can be of metal, such as copper, so that fluid can flow from hose 158 into tube 184 without leakage. Tube 184 has an O.D. of ¼ inch (0.635 cm) and I.D. of 3/16 inch (0.48 cm). Copper tube 184 thence descends downward towards the exhaust pipe and bends so to extend about the leg 36 of the exhaust pipe, as seen in FIG. 1 and extends about leg 36 across the intersection with main leg 40 and thence across the top of exhaust leg 34 towards engine 15, and thence tube 184 extends upwardly. The tube 184 is secured to the exhaust pipe by five circular clamps 186, 188, 190, 192, and 194, the tops of which are seen in FIG. 1, each clamp being a common ring type clamp with a circular portion having flanges at the ends of the ring, the upper side of the flanges 196, 198, 200, 202, and 204 being seen in FIG. 1, with screw bolts 206, 208, 210, 212, and 214 respectively securing the flanges of the ring ends together so that they grip about the pipe. Between the upper side of tube 184, and each of the ring clamps are curved metal buffer plates 216, 218, 220, 222, and 224, respectively which act to distribute the binding force of the clamps over a broader area so as to prevent the clamps from cutting into tube 184. These buffer plates are somewhat oblong in shape and curve into an arcuate shape to fit within the clamps, and on the outside of the exhaust pipe.

Other suitable means can be used to secure the tube 184 to the exhaust pipe.

After tube 184 passes through clamp 194, it extends upwardly towards the upper part of the engine. We now make reference to some of the structure of the V-8 engine 15, the engine has typical valve head covers 228 and 230. As known in the art, the V-8 engine 15 has a PCV valve connection to the adapter plate 22. Referring to FIG. 6, extending from the top of head cover 230 is a crankcase vent sleeve 232 extending from a cap 233 which fits within an opening in cover 230. Sleeve 232 is snugly received within a rubber vent hose section 234, and held thereto by a ring clamp 235, as in known in the art. Beneath vent sleeve 232 is a positive crankcase ventilation (PCV) valve which is not shown. The purpose of the PCV arrangement in automobile engines is to control the flow rate of oil fumes flowing from the engine crank case and oil sump to the adapter plate for mixture with fuel and air flowing to the engine cylinders. The present arrangement shows the standard hose segmented into the hose sections 234 and 236 with a copper T-tube 238 having upper cross arms 240 and 241 each fitting snugly within the outer ends of hoses 234 and 235 respectively, and held thereto by ring clamps 243 and 244 to allow fluid flow from hose 234 to hose 236. T-tube 238 has an intersecting middle arm 245 with its end being threaded to receive a nut 246 having a threaded sleeve 247. The upper end of tube 184 is flared outwardly to fit about the end of sleeve 247 so that a nut 248 can screw about sleeve 247 and press the end of tube 184 against sleeve 247 so that fluid flows from tube 184 into T-tube arm 245. This is a standard fitting. The arms of T-tube 238 are normally 0.42 inch (1.0668 cm) or 0.29 inch (0.7366 cm) I.D. Hose segments 234 and 236 are normally ⅜ or ½ inch (0.9525 or 1.225 cm) I.D., depending on accommodation with the engine design.

Figure 4:
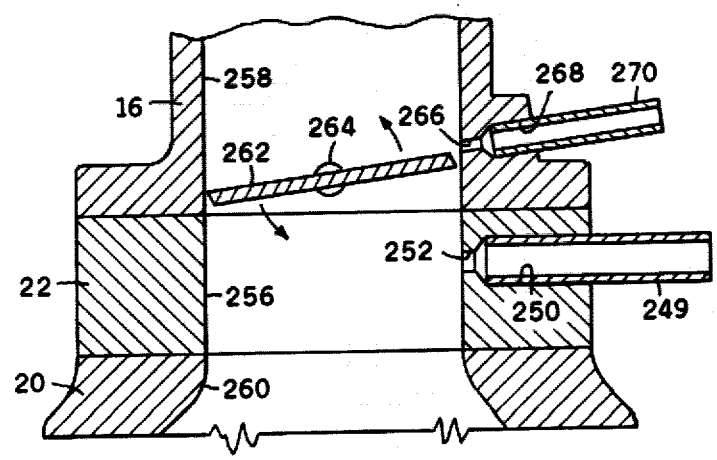
FIG. 4 is a section showing a typical carburetor, adapter plate, and intake manifold, with connections to the flow assembly.

Hose 236 extends towards the adapter plate and receives within its wall a cylindrical tube 249, and held thereto by a ring clamp 251. As seen in FIG. 4, tube 249 extends to fit snugly within a circular bore 250 in the adapter plate 22. Bore 250 extends into a smaller cylindrical bore 252 that connects with the fluid flow bore 256 of the adapter plate. FIG. 4 shows the top of the intake manifold 20 positioned beneath the adapter plate 22, with part of the carburetor 16 shown above adapter plate 22. The carburetor 16 has a flow bore 258 in connection with the adapter bore 256 which along with the bore 260 of the intake manifold 20 forms a flow path for fuel as is known in the art. Positioned within bore 258 is a throttle plate 262 pivotally mounted about a rod 264 so as to be able to pivot by operation of the throttle linkage (not shown) in the direction of the arrows. FIG. 4 shows the throttle in closed position. As will be later described, fluid can thus flow from the water tank through its connecting hoses to the flow control assembly and thence through the hoses, thence through tube 184 into the hose 236 and thence into the adapter plate bore 256.

In further description of FIG. 4, there is also shown a small bore 266 in connection with the carburetor bore 258 extending from a point just above the adjacent end of the throttle plate 262. The small bore 266 extends outwardly into a larger bore 268 within which is received a cylindrical hose 270 which is connected in a fashion to be described.

Referring back now to the control assembly 12, hose 168 extends from its top connection to the control assembly downwardly as shown in FIG. 1 to near the exhaust pipe leg 40 at which point it snugly receives the upper end of a tube 274. Tube 274 bends to be received under the buffer plate 216 and clamp 186 so that it is held against exhaust leg 40. Tube 274, like tube 184, is composed of a suitable heat exchange metal such as copper having a high heat exchange coefficient so that heat from the exhause pipe legs is transferred to the tubes 184 and 274 to heat fluids flowing through them. The lower end 276 of tube 274 is open to the atmosphere so that atmospheric air may be drawn through opening 276 through hose 168 and into hose 140.

On the other side of T-tube 126, the hose 164 extends between the legs of U-shaped bracket 278 which is secured by screws to brace 174 so that hose 164 is supported. Thence hose 164 curves towards the direction of the carburetor as seen in FIG. 1 so that its outer end receives a cross leg of a plastic T-tube 280, while the opposite cross leg of T-tube 280 fits snugly within the end of the hose 270 so that fluid can flow through hose 164 through the T-tube 280 cross arms into hose 270. T-tube 280 is of the same size as T-tube 114.

FIG. 1 shows an arrangement whereby the middle leg of the T-tube 280 fits within a hose 284 which extends to the spark advance housing 286 as is known in the art. As the hose from the spark advance is commonly connected to carburetors known in the art at the point where hose 270 is shown extending into the carburetor 16, it is possible with many commercially available carburetors to insert the hose 270 at the point shown, then connect the hose used for connecting the spark advance in the manner shown of connecting hose 284 to hose 270 as described above. However, in many automobiles, the hose from the advance housing does not extend directly to the carburetor housing 286, but goes to the PVS valve connection, or some other connection. However, for illustrative purposes we show the arrangement of FIG. 1.

Air can thus flow through opening 276 of tube 274 through the connecting hoses 168, 140, 132 and 164 to hose 270 and thence into the carburetor through bore 266, without leakage at the junction points of the hoses and tubes. Air can also flow to the hose 236 via members 274, 168, 140, 122, 77, 98, 111, 93, 154, 184 and 240.

Hose 182 extends from the control assembly 12, T-tube leg 113 towards the dashboard 14 and can pass through a hole in the wall barrier between the engine and passenger compartment. Mounted upon dashboard 14 is a vacuum gauge 290 and an on/off petcock valve 292. Hose 182 extends to a T-tube 294 which has a pair of oppositely extending cross arms, one fitting snugly within hose 182 and the other extending oppositely to fit within the lower end of a hose 298. The upper end of hose 298 fits within the neck 300 at the base of gauge 290 so that fluid pressure can be communicated from hose 298 to the gauge 300. T-tube 294 has a third cross arm, extending perpendicular to the other tube cross arms, which is snugly received within the lower end of a hose 302. Hose 302 extends upwardly to be connected to the base of tube section of petcock valve 292 so that atmospheric air can flow through valve 292 when knob 304 is in the open position, there being no flow when knob 304 is in the closed position.

Operation

Operation will be described in the context of the operation of the engine 15 in propelling an automobile though the flow control system can be used with internal combustion engines for all uses. The operation of the system by the existance of pressure differentials is the same for all engines. However, we give the following description of operation according to the operation with a V-8 engine of 289 cubic inches (4735.84 cubic cm). With the engine ignition turned on, the pistons in the engine 15 function as a vacuum pump as a V-8 engine does, to suck air from the atmosphere into the carburetor choke opening 17 and through the carburetor, adapter plate and intake manifold to the engine cylinders. In the carburetor at a position above the throttle plate, fuel from the fuel inlet nozzle (not shown) is mixed with air coming through the choke opening 17, as is well known in the art, with the amount of fuel flowing past the throttle plate being virtually none at idle. First, the conditions of operating the engine 15 at idle will be discussed, with petcock knob 304 turned to its second position to shut off flow through nozzle 306. At engine idle conditions, the throttle plate 262 is in the position shown in FIG. 4, with fuel being drawn through the carburetor idle discharge ports (not shown) as is well known in the art.

As can be seen from FIG. 4, with the throttle plate 262 positioned as shown for idle, there is virtually no fluid flow through carburetor bore 258 above the throttle plate 262, so that the pressure above throttle plate 262 is atmospheric pressure with zero inches (zero cm) Hg vacuum relative to the atmosphere.

For idle conditions, with the engine located in an environment at atmospheric pressure, adapter plate bore 256 is at a vacuum of eighteen inches (45.72 cm) mercury (Hg) relative to atmospheric pressure. The interior of water tank 10, hose 54 and tube 61 are at atmospheric pressure, or at a vacuum of zero inches (zero cm) Hg. The pressure differential between tank 10 and adapter plate bore 256 acts through hose 236, tube 184, and hoses 158 and 93 to pull water from the tank through hose 54 and through the spiral flow path of orifice piece 64 and thence into T-tube 71. The pressure drop across orifice piece 64 is two inches (5.08 cm) Hg. In T-tube 71, the water mixes with air from hose 77 as will be more fully explained later. Water and air then flow from T-tube 71 through the spiral flow path of orifice piece 84 into T-tube leg 89, with there being a vacuum pressure drop of sixteen inches (40.64 cm) Hg.

At the top of the flow control system, the vacuum pressure within copper tubes 164 and 166 and hoses 164 and 168 is at atmospheric pressure, and hence is zero inches (zero cm) Hg vacuum relative to atmospheric pressure. At idle, air flows from hose 164 into T-tube 126, from the carburetor, and air from hose 168 which is preheated in tube 274 by heat from the exhaust pipe leg 36 also flows into T-tube 71. The air flowing from hose 164 flows through the spiral flow path of orifice piece 136 into T-tube 126, with there being a vacuum pressure drop of two inches (5.08 cm) Hg across orifice piece 136. Air flowing from hose 168 passes through filter 144 so that the filter removes dust and grease particles, and thence passes through the spiral flow path of orifice piece 142 into T-tube 126, with there being a vacuum pressure drop of two inches (5.08 cm) Hg across orifice piece 142. There is thus a vacuum of two inches (5.08 cm) Hg in T-tube 126.

Air flowing into T-tube 126 at the top of the flow control system 12 flows to T-tube 114 at which point flow is divided. In one direction flow goes through hose 111 and into T-tube 104. Since the petcock knob 304 is positioned to block air from passing in nozzle 306, there is no flow through leg 113 of T-tube 104. Air from T-tube 104 flows downward through its leg 107 around the spiral flow path of orifice piece 100 and thence around the spiral flow path of orifice piece 99, and thence into T-tube 87, with there being a total vacuum pressure drop of sixteen inches (40.64 cm) Hg across the two orifice pieces 99 and 100, to be at the pressure of about eighteen inches (45.72 cm) Hg vacuum within T-tube 87.

The other direction of flow for air from T-tube 114, is downwardly into hose 77 and into T-tube 71 where the air mixes with water flowing from hose 63 into T-tube 71 and thence flows to T-tube 87 as previously explained.

The mixture of air and water passes out of T-tube 87 through hose 93 and hose 158, thence through the copper tube 184. As the water and air mixture begins flowing through tube 184, it is heated by heat from the exhaust pipe, and the liquid water is converted to steam, so that steam passes from tube 184 into the T-tube 238, and thence flows through hose 236 through bore 252 into the adapter plate bore 256 beneath the throttle plate 262.

At idle, the steam mixture coming from hose 236 is mixed with the fuel and air mixture from the carburetor coming from the carburetor idle discharge port (not shown), so that the steam and fuel mixture passes through intake manifold 20 into the engine cylinders.

Now conditions at cruise shall be discussed. When the automobile is cruising, i.e., when it is not accelerated but is at constant velocity, on level terrain, the engine 15 is in a light load state. It is desired to have the maximum steam flow through bore 252 at cruise speed because not as much fuel is needed at the light load condition at cruise than when greater loads are placed in the engine such as during acceleration. At cruise, the throttle plate 262 is rotated in the counterclockwise direction of the arrows of FIG. 4 to the cruise position with the right edge of the throttle plate located above bore 266, and maintained in that position. At cruise conditions, it has been found that the pressure at the carburetor bore 258, hose 270 and hose 164 is about sixteen inches (421.64) Hg vacuum. At cruise, the pressure at tube 166 is about zero inches (zero cm) vacuum. Air is thus pulled through tube 274, hose 168 and tube 166 through filter 144 and around the spiral flow path of orifice piece 142 into T-tube 126 with a pressure drop across orifice 142 of about eight inches (20.32 cm) Hg, so that there is an eight inch (20.32 cm) Hg vacuum in T-tube 126. Part of the air flowing into T-tube 126 passes through T-tube leg 130 about the spiral flow path of orifice piece 136, with a pressure drop of eight inches (20.32 cm) Hg, and thence passes through hose 164 and thence hose 270 into carburetor bore 258. The other part of the air entering T-tube 126 passes downward through leg 128 into hose 122 and into T-tube 114.

At cruise, the pressure at the adapter plate bore 256 is a vacuum of about sixteen inches (40.64 cm) Hg. Water at atmospheric pressure in tank 10 is pulled through hose 54, and thence flows about the spiral flow path of orifice piece 64 into T-tube 71 with a pressure drop of eight inches (20.32 cm) Hg across orifice piece 64. At T-tube 71, as a result of the vacuum pull from T-tube 126 above, and as a result of the resistance to flow offered by orifice piece 84, part of the water flowing from orifice piece 64 rises in hose 77 into T-tube 114 where it mixes with air coming from T-tube 126, and thence the air and water mixture passes through T-tube leg 116 through hose 111 into T-tube 104, and then passes downward through T-tube leg 107 and then flows about the spiral flow path of orifice piece 100 and then about the spiral flow path of orifice piece 98 into T-tube 87. The combined pressure drop across orifice pieces 99 and 100 is eight inches (20.32 cm) Hg vacuum.

Water flow into T-tube 71 also flows through T-tube leg 79 about the spiral flow path of orifice piece 84 into leg 89 of T-tube 87, with there being a vacuum pressure drop of eight inches (20.32 cm) Hg across orifice 84. At the T-tube 87 junction, the water-air mist from hose 98 mixes turbulently with the water from hose 82, and that mixture is pulled through hose 93 on to hose 236 into the adapter plate bore 256. The arrangement of having a bypass water flow through hoses 77, 111 and 98 allows water to flow through orifice pieces 100 and 99 at a slower rate than water flows through orifice piece 84 in hose 82. At cruise, orifice 84 is sized to cause water flow through it to be slow so that water rises in hose 77 to mix with air from T-tube 126, and passes through hose 111 to flow through orifices 100 and 99. Therefore, the flow through hoses 77, 111 and 98 at cruise is a mist mixture of air and water, while flow through hose 82 is of water only. The bypass flow through hoses 77, 111 and 98 prevents water back-up behind orifice 84, and provides another water flow path into T-tube 87, in addition to hose 82, so that sufficient amounts of water can be supplied through hoses 93 and 158.

At T-tube 87, the water flow from hose 82 is hit by the high velocity mist coming from hose 98, so that there is a turbulent mixture of air and water in T-tube 87 which mixture accelerates through hose 93 and hose 158 and thence passes through copper tube 184 where it is heated to convert the liquid water to steam, and thence passes through hose 236 through adapter plate bore 252 into the adapter plate bore 256, where the steam is mixed with the air-fuel mixture provided by the carburetor fuel nozzle.

When the engine is at peak load conditions, the throttle plate 262 is in the wide open position, i.e., it extends approximately parallel to the walls of bore 258 and the bores 256 and 258 are close to atmospheric pressure and thus have no vacuum relative to the atmosphere, there is no steam pulled through hose 236 nor water pulled from the water tank, nor is air pulled through hose 270. Therefore, no steam is pulled into the adapter bore at peak load conditions, and the engine receives the same quantity of fuel that it would receive without the presence of the flow assembly 11.

At loads greater than cruise load, the adapter plate bore 256 has a vacuum that is not as great as the vacuum at cruise, since the throttle plate is rotated more in the counterclockwise direction than it is at cruise, and hence the flow of steam through hose 236, and of water through hose 158 is less than the flows at cruise speed. Therefore, proportionally less steam is mixed with fuel when the engine loads are greater than at cruise.

The gauge 290 can be read by an operator sitting in the auto to get pressure readings for the flow control system at the points of T-tubes 104, 114, 71 and 126 as those four T-tubes are connected without a spiral orifice obstructing the flow paths connecting them. Once the operator becomes familiar with this system he can read the pressure gauge to see if the system is functioning as it should under the load conditions to which the engine is subjected.

The petcock knob 304 can be rotated to the open position to bleed in atmospheric air at nozzle 306 and this can be done when it is desired to allow water within the flow control system to flow through tube 184. With the petcock knob 304 in the open position, suction from the engine cannot act to cause water to flow through orifice piece 64, since hose 77, hose 111, hose 182, T-tube 104, and water tank 10 would all be open to the atmosphere.

There is thus established a first conduit for fluid flow extending from the water tank through hose 54, tube 61, hose 63, T-tube 71, hose 82, T-tube 87, nose 93, tube 154, hose 158, heating tube 184, T-tube 238, and hose 236 to the adapter plate bore 256.

There is a second conduit extending from opening 276 of tube 274 through tube 274 and thence through hose 168, tube 166, hose 140, T-tube 126, hose 132, tube 162, hose 164, T-tube 280, and hose 270 to connection with the carburetor bore 258.

A third conduit extends through leg 128 of T-tube 126 through hose 122, and through T-tube legs 120 and 118, thence through hose 77, through T-tube leg 75 to connect the first and second conduits.

A fourth conduit extends through T-tube leg 116, hose 111, T-tube legs 109 and 107, hose 98 and T-tube leg 95 to connect the third and first conduit. The T-tubes 71, 87, 104, 114, and 126 provide the intersection points between the conduits.

The second conduit has the hoses 132 and 140 with their orifices 136 and 142, and T-tube 126, and filter 144, which are components of the flow control system.

The flow control system has components in the first conduit which comprise hoses 63 and 82 with their orifices 64 and 84, T-tubes 71 and 87, and also hose 93, although of course hose 93 could be eliminated by a direct connection to hose 158 to T-tube leg 91.

Figure 3:
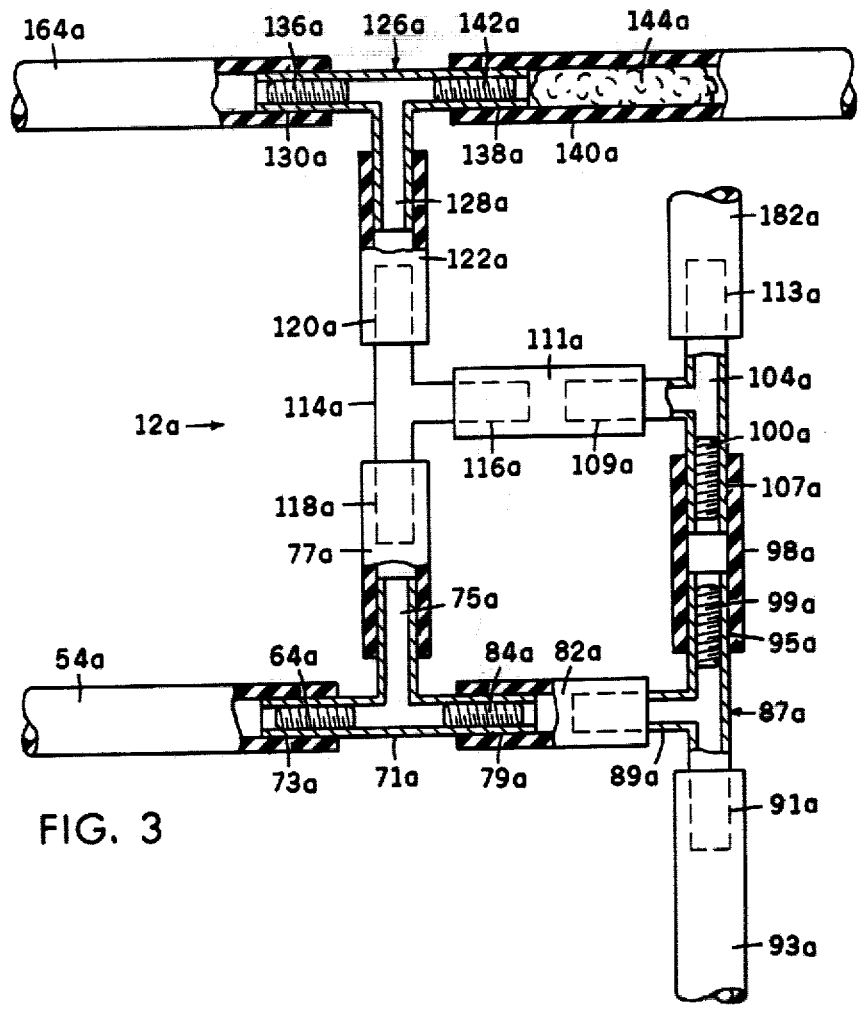
FIG. 3 is a modification of the flow control assembly, some parts being shown in section.

A modification of the flow control system is shown in FIG. 3, in which the basic difference from FIG. 2 is that the orifice pieces are placed within the T-tubes rather than within the hoses. As shown in FIG. 3, the T-tubes 71a, 87a, 104a, 114a, and 126a correspond to their similarly numbered counterparts of FIG. 2, and have legs corresponding in number to the T-tube legs of FIG. 2, with the T-tube legs in FIG. 3 having an O.D. of approximately ¼ inch (0.635 cm) and an I.D. of slightly less than 3/16 inch (0.48 cm) so that they snugly receive their orifice pieces 99a, 84a, 64a, 136a, 142a, and 100a, as shown in FIG. 3. (Orifice pieces are of the same size as their numerical counterparts of FIG. 2.)

The hose 164a snugly receives T-tube leg 130a, so that there is no intermediate connecting tube such as tube 162 of FIG. 2. Likewise hose 54a snugly receives T-tube leg 73a without an intermediate connecting tube 61 such as in FIG. 2, and T-tube leg 91a is snugly received within hose 93a without an intermediate connecting tube 154 such as in FIG. 2.

The intersection points of the T-tube legs in FIG. 3 can be made the same dimensions as in FIG. 2, however since hoses 77a, 98a and 122a can be made from the same length hose, the dimension from leg 109a to leg 89a can be less than the dimension from leg 109 to leg 89.

The flow control system 12a functions in the same fashion described for control system 12, with filter 144a acting to filter air, and with water and air passing about the spiral flow paths of the orifice pieces as explained for the earlier discussed embodiment.

The present invention thus provides a mixture of steam with the normal fuel-air mixture of an internal combustion engine. The amount of fuel used is less than the amount of fuel used without the presence of the invention. This is especially the case when the engine is operated at cruise or idle conditions, under which conditions many engines function during the normal course of operation, such as during the operation of an automobile.

The spiral orifice pieces offer the advantages of shortening the overall length of the orifice structure. The bends or turns of the spiral orifice create more friction than would be caused by a straight orifice path, and thus there is a greater pressure drop across the spiral orifice than with a straight orifice of the same length.

The orifice pieces 64, 84, 136, 142, 99 and 100 are all shown as having equal lengths with the spiral flow paths formed about those orifice pieces being of equal length. The total length of the two combined orifice pieces 99 and 100 is twice the length of each of the orifice pieces 64, 84, 136 and 142, and the total spiral flow path about the pieces 99 and 100 is twice the length of the spiral flow path of each of the pieces 64, 84, 136 and 142. A single orifice piece of the same diameter, threads per inch (cm.), and same total length as the two orifice pieces 99 and 100 can be substituted in place of pieces 99 and 100, with the substituted single piece having the same length spiral flow path about it as the combined spiral flow path about pieces 99 and 100. However, in the embodiment shown in the drawings, it is convenient for assembly to have the orifice pieces 64, 84, 136, 142, 99 and 100 of identical shape and size.

It is desired to have the copper tube 184 extend about the exhaust pipe as shown. If tube 184 is wound into a number of coils around the exhaust pipe there is a decrease in velocity of the steam flowing through the tube, which can cause a blockage. The increase in the turns and bends in the tube increases the friction for steam flowing through the tube, and therefore tube 184 has only a small number of bends but yet receives excellent heat transfer from the exhaust pipe. The heating system for the steam has a low thermal inertia because the exhaust pipes of most automobiles take a very short time to become heated, and only a few drops of water are ever in the system at a given point in time.

The system shown has no moving parts, yet through the spiral orifice pieces and the flow control bypass arrangement, it operates in an automatic fashion to adjust to the different loads upon the engine to allow an appropriate amount of steam to flow into the adapter plate bore to flow with the air fuel mixture to the engine cylinders.

The presence of steam provides a cleansing effect for the adapter plate bore, the intake manifold, valves and the engine cylinders by cleaning the metal the steam contacts. The injection of the steam at the adapter plate bore creates turbulence and increases the intermixture between the air and fuel, which causes a more uniform distribution of air and fuel per unit volume which effects a better distribution of fuel to each cylinder so that the amount of fuel and air received by each cylinder from the intake manifold is more nearly equal. The steam further provides better vaporization of the fuel for more efficient fuel combustion.

The presence of the steam increases the inlet manifold temperature and reduces the peak temperature of combustion within the engine cylinders. The presence of steam within the engine cylinders during combustion is helpful as the steam acts as a heat sink to absorb the heat of combustion to reduce the combustion zone temperature and to reduce the tendency of the engine to knock.

The use of the present invention with an automobile engine has reduced fuel consumption by the rate of from ten to twenty percent more miles per gallon of fuel than without the presence of this invention.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:
   (a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;
   (b) a second conduit for connection to the atmosphere and for connection to said fuel flow path at a point above the throttle plate;
   (c) a third conduit for connecting the second conduit to the first conduit at a point in the first conduit between the water source and the heating means to allow fluid flow between the first and second conduits;
   (d) a fourth conduit for connecting the third conduit to the first conduit at a point in the first conduit between the association of the first conduit with the heating means and the connection of the first conduit with the third conduit; and
   (e) means for controlling fluid flow through the conduits.

2. The structure of claim 1 wherein the means for controlling flow comprises at least one spiral orifice.

3. The structure of claim 1 wherein the flow control means are located within the first, second and fourth conduits.

4. The structure of claim 1 wherein the means for controlling flow comprises the first conduit having means for controlling fluid flow located between the water source and the intersection of the first and third conduits, and flow control means located between the intersection of the first and third conduits and the intersection of the first and fourth conduits.

5. The structure of claim 1 wherein the means for controlling flow comprises the second conduit having flow control means located between connection of the second conduit with the fuel flow path and the intersection of the second and third conduits, and flow control means located between the intersection of the third and second conduits and connection of the second conduit to the atmosphere.

6. The structure of claim 1 wherein each of the flow control means for the first conduit comprises a spiral orifice positioned within the first conduit.

7. The structure of claim 1 wherein each of the flow control means in the second conduit comprises a spiral orifice positioned within the second conduit.

8. The structure of claim 5 wherein the second conduit is associated with the heating means to heat fluid flowing through the second conduit.

9. The structure of claim 1 wherein the fourth conduit has flow control means contained within it.

10. The structure of claim 9 wherein the flow control means within the fourth conduit is a spiral orifice.

11. The structure of claim 1 wherein the means for controlling flow comprises:
   (i) the first conduit having a spiral orifice located between the water source and the intersection of the first and third conduits, and a spiral orifice located between the intersection of the first and third conduits and the intersection of the first and fourth conduits;
   (ii) the second conduit having a spiral orifice located between connection of the second conduit with the fuel flow path and the intersection of the second and third conduits, and a spiral orifice located between the intersection of the third and second conduits and connection of the second conduit to the atmosphere;
   (iii) and a spiral orifice located within the fourth conduit;
   (iv) each of the spiral orifices in the first and second conduits having spiral flow paths of about equal length, and the spiral orifice in the fourth conduit having a spiral flow path about twice as long as the spiral flow path of each of the spiral orifices in the first and second conduits.

12. A system of injecting steam into the fuel-air flow in an internal combustion engine having at least one cylinder; said engine having a carburetor with a throttle plate, with a fuel flow path extending from the carburetor to the engine cylinder; the engine providing a means of producing heat; and a water reservoir present; said system comprising:
   (a) a first conduit having first, second, third and fourth openings, the first opening being for connection to the water reservoir so that water can flow from the reservoir into the first conduit, the first conduit being associated with said heat source so that as water flows through the first conduit it is converted to steam by heat from the heat source, said first conduit extending from association with said heat source to extend for connection to the said fuel flow path with the fourth opening for connection to the fuel flow path at a point between the throttle plate and the engine cylinder, the first conduit having within it a first spiral orifice for controlling fluid flow located between the first and second openings of the first conduit, and a second spiral orifice for controlling fluid flow located between the second and third openings of the first conduit;
   (b) a second conduit having first, second and third openings, the first said opening for connection to the atmosphere, the second opening for connection to the fuel flow path above the throttle plate, the second conduit having within it a third spiral orifice for controlling fluid flow located between the first and second openings of the second conduit, and a fourth spiral orifice for controlling fluid flow located between the second and third openings of the second conduit;

(c) a third conduit having first, second and third openings, the first opening of the third conduit connected to the third opening of the second conduit and the second opening of the third conduit connected to the second opening of the first conduit so that fluid can flow between the first and second conduits through the third conduit; and, (d) a fourth conduit having first and second openings, the first opening of the fourth conduit connected to the third opening of the third conduit, and the second opening of the fourth conduit connected to the third opening of the first conduit so that fluid can flow between the first and third conduits through the fourth conduit, the fourth conduit having within it a fifth spiral orifice for controlling fluid flow.

13. The structure of claim 1 further comprising a valve connected to the one of the third or fourth conduits, said valve operable to be closed, and to be open to connect the third and fourth conduits directly to atmospheric air.

14. The structure of claim 1 further comprising a pressure gauge connected to one of the third or fourth conduits for obtaining pressure readings within the third and fourth conduits.

15. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path;

(b) a second conduit for connection to the atmosphere and for connection to said fuel flow path;

(c) a third conduit for connecting the second conduit to the first conduit at a point in the first conduit between the water source and the heating means to allow fluid flow between the first and second conduits; and (d) means for controlling fluid flow through the conduits.

16. The structure of claim 15 wherein the flow control means comprises a fourth conduit in connection with one of the other conduits.

17. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path;

(b) means for controlling flow in the first conduit located at first and second locations;

(c) a bypass conduit connected to the first conduit at a point between the first and second flow control locations and at a point between the second location and the means for heating so that water can flow through the bypass conduit to bypass flow through the second flow control location.

18. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;

(b) a second conduit for connection to the atmosphere and for connection to said fuel flow path at a point above the throttle plate;

(c) a third conduit for connecting the second conduit to the first conduit at a point in the first conduit between the water source and the heating means to allow fluid flow between the first and second conduits;

(d) a fourth conduit for connecting the third conduit to the first conduit at a point in the first conduit between the association of the first conduit with the heating means and the connection of the first conduit with the third conduit; and (e) means for controlling fluid flow through the conduits, comprising the first conduit having means for controlling fluid flow located between the water source and the intersection of the first and third conduits, and flow control means located between the intersection of the first and third conduits and the intersection of the first and fourth conduits.

19. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;

(b) a second conduit for connection to the atmosphere and for connection to said fuel flow path at a point above the throttle plate;

(c) a third conduit for connecting the second conduit to the first conduit at a point in the first conduit between the water source and the heating means to allow fluid flow between the first and second conduits;

(d) a fourth conduit for connecting the third conduit to the first conduit at a point in the first conduit between the association of the first conduit with the heating means and the connection of the first conduit with the third conduit; and (e) means for controlling fluid flow through the conduits, comprising the second conduit having flow control means located between connection of the second conduit to the fuel flow path and the intersection of the second and third conduits, and flow control means located between the intersection of the third and second conduits and connection of the second conduit to the atmosphere.

20. A system of injecting steam into the fuel-air flow of a internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;

(b) a second conduit for connection to the atmosphere and for connection to said fuel flow path at a point above the throttle plate;

(c) a third conduit for connecting the second conduit to the first conduit at a point in the first conduit between the water source and the heating means to allow fluid flow between the first and second conduits;

(d) a fourth conduit for connecting the third conduit to the first conduit at a point in the first conduit between the association of the first conduit with the heating means and the connection of the first conduit with the third conduit; and (e) means for controlling fluid flow through the conduits, comprising:
  (i) the first conduit having a spiral orifice located between the water source and the intersection of the first and third conduits, and a spiral orifice located between the intersection of the first and third conduits and the intersection of the first and fourth conduits;
  (ii) the second conduit having a spiral orifice located between connection of the second conduit with the fuel flow path and the intersection of the second and third conduits, and a spiral orifice located between the intersection of the third and second conduits and connection of the second conduit to the atmosphere;
  (iii) and a spiral orifice located within the fourth conduit;
  (iv) each of the spiral orifices in the first and second conduits having spiral flow paths of about equal length, and the spiral orifice in the fourth conduit having a spiral flow path about twice as long as the spiral flow path of each of the spiral orifices in the first and second conduits.

21. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;

(b) a second conduit for connection to the atmosphere and for connection to said fuel flow path at a point above the throttle plate;

(c) a third conduit for connecting the second conduit to the first conduit at a point in the first conduit between the water source and the heating means to allow fluid flow between the first and second conduits;

(d) a fourth conduit for connecting the third conduit to the first conduit at a point in the first conduit between the association of the first conduit with the heating means and the connection of the first conduit with the third conduit; and (e) means for controlling fluid flow through the conduits, said means for controlling flow comprising stationary means for controlling flow in the first conduit at a point between the water source and the part of the first conduit associated with the means for heating.

22. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;

(b) a second conduit for connection to the atmosphere and for connection to said fuel flow path at a point above the throttle plate;

(c) a third conduit for connecting the second conduit to the first conduit at a point in the first conduit between the water source and the heating means to allow fluid flow between the first and second conduits;

(d) a fourth conduit for connecting the third conduit to the first conduit at a point in the first conduit between the association of the first conduit with the heating means and the connection of the first conduit with the third conduit; and (e) means for controlling fluid flow through the conduits to provide maximum flow of steam through the first conduit to the fuel flow path when the engine is at cruise conditions.

23. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:

(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;
(b) a second conduit for connection to the atmosphere and for connection to said fuel flow path at a point above the throttle plate;
(c) a third conduit for connecting the second conduit to the first conduit at a point in the first conduit between the water source and the heating means to allow fluid flow between the first and second conduits;
(d) a fourth conduit for connecting the third conduit to the first conduit at a point in the first conduit between the association of the first conduit with the heating means and the connection of the first conduit with the third conduit; and
(e) means for controlling fluid flow through the conduits to provide flow of steam through the first conduit to the fuel flow path when the engine throttle is at the idle position, and to provide approximately no flow of steam through the first conduit to the fuel flow path when the throttle is in the wide open position.

24. The structure of claim 1 wherein said bypass conduit has a means for controlling flow through the by-pass conduit.

25. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:
(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;
(b) a second conduit for connection to the atmosphere and for connection to said fuel flow path at a point above the throttle plate;
(c) a third conduit for connecting the second conduit to the first conduit at a point in the first conduit between the water source and the heating means to allow fluid flow between the first and second conduits;
(d) a fourth conduit for connecting the third conduit to the first conduit at a point in the first conduit between the association of the first conduit with the heating means and the connection of the first conduit with the third conduit; and
(e) means for controlling fluid flow through the conduits, comprising at last one spiral orifice.

26. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:
(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;
(b) a second conduit for connection to the atmosphere and for connection to said fuel flow path at a point above the throttle plate;
(c) a third conduit for connecting the second conduit to the first conduit at a point in the first conduit between the water source and the heating means to allow fluid flow between the first and second conduits;
(d) a fourth conduit for connecting the third conduit to the first conduit at a point in the first conduit between the association of the first conduit with the heating means and the connection of the first conduit with the third conduit; and
(e) means for controlling fluid flow through the conduits, comprising a spiral orifice positioned within the first conduit and a spiral orifice positioned within the second conduit.

27. A system of injecting steam into the fuel-air flow of an internal combustion engine having at least one cylinder, said engine having a carburetor with a throttle plate and a fuel flow path from the carburetor to the engine cylinder; a means of producing heat; a water source present; said system comprising:
(a) a first conduit for connection to the water source and extending to association with the means for heating so that water flowing through the first conduit is converted to steam, said first conduit thence extending for connection with the fuel flow path so that steam from the first conduit can be injected in said fuel flow path at a point between the throttle plate and the engine cylinder;
(b) a second conduit for connection to the atmosphere and for connection to said fuel flow path at a point above the throttle plate;
(c) a third conduit for connecting the second conduit to the first conduit at a point in the first conduit between the water source and the heating means to allow fluid flow between the first and second conduits;
(d) fourth conduit for connecting the third conduit to the first conduit at a point in the first conduit between the association of the first conduit with the heating means and the connection of the first conduit with the third conduit; and
(e) means for controlling fluid flow through the conduits, comprising:
  (i) the first conduit having a spiral orifice located between the water source and the intersection of the first and third conduits, and a spiral orifice located between the intersection of the first and third conduits and the intersection of the first and fourth conduits;
  (ii) the second conduit having a spiral orifice located between connection of the second conduit with the fuel flow path and the intersection of the second and third conduits, and a spiral orifice located between the intersection of the third and second conduits and connection of the second conduit to the atmosphere;
  (iii) and a spiral orifice located within the fourth conduit.

* * * * *